March 31, 1936. A. GOUDSMIT ET AL 2,035,649
PHOTOMETER
Filed June 1, 1935 2 Sheets-Sheet 1
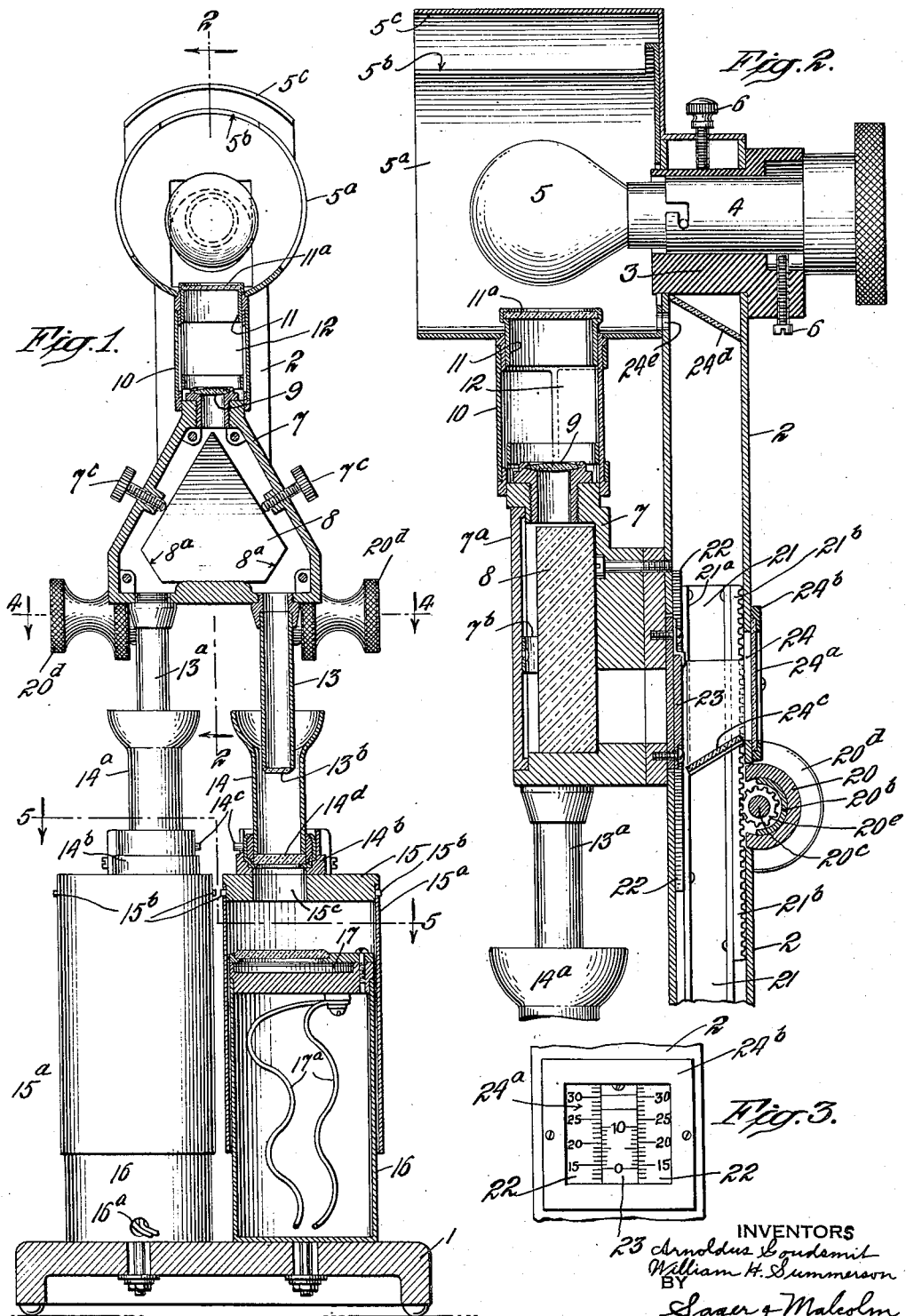
INVENTORS
Arnoldus Goudsmit
William H. Summerson
BY
Sager & Malcolm
ATTORNEYS March 31, 1936.　　A. GOUDSMIT ET AL　　2,035,649
PHOTOMETER
Filed June 1, 1935　　2 Sheets-Sheet 2

INVENTORS
Arnoldus Goudsmit
William H. Summerson
BY
Sager & Malcolm
ATTORNEYS

Patented Mar. 31, 1936

2,035,649

UNITED STATES PATENT OFFICE 2,035,649

PHOTOMETER

Arnoldus Goudsmit, New York, and William H. Summerson, Jackson Heights, N. Y.

Application June 1, 1935, Serial No. 24,486

13 Claims. (Cl. 88—14)

This invention relates to photometers and to a novel method and apparatus for determining either the concentration or turbidity of a solution as compared with another, such as a standard, and for ascertaining the light transmission of a medium compared with that of another medium.

The main objects of this invention are to produce an instrument which will maintain stability during its use, be highly sensitive and be of a comparatively simple form of construction and conveniently usable. Another object is to provide an instrument wherein the possible sources of error may be compensated for by a simple form of adjustment and thereby increase the dependability and accuracy of the instrument. Another object is to avoid the human error that arises when attempting to judge the intensity of light by the eye. Another object is to provide an instrument whereby the use of graphs and calibration curves is limited to those solutions which do not show the theoretical relationship between concentration and light absorption. Another object is to provide an instrument of such a degree of precision that a minimum of successive measurements is required, and wherein the concentration of a solution to be tested may be computed from a scale showing its relation to a standard solution by a comparison therewith under identical conditions. Other objects and advantages of this invention will be understood from the following description and accompanying drawings which illustrate a preferred embodiment of the invention.

Figure 4:
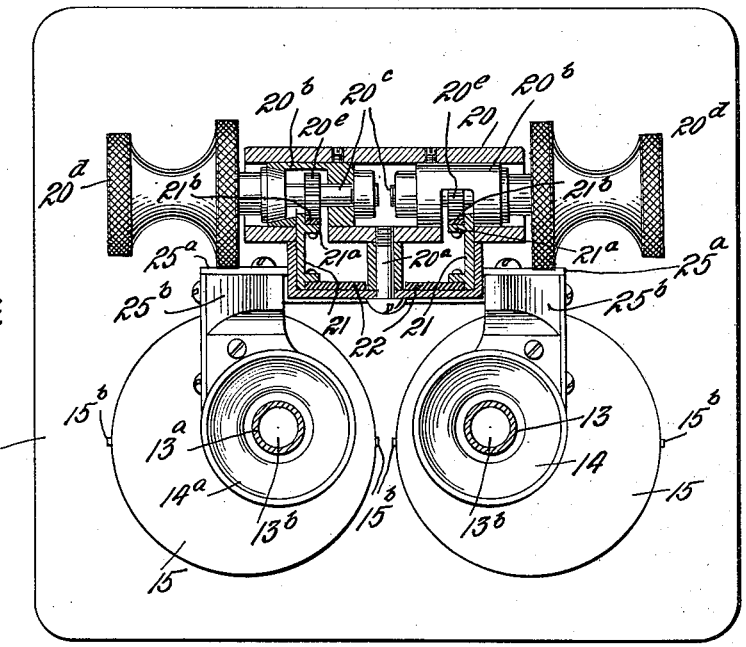
Figure 5:
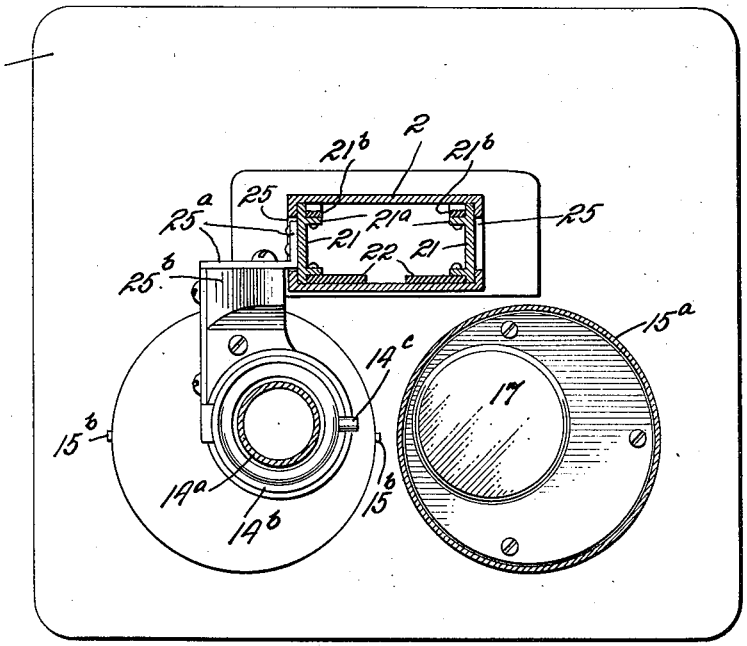
Figure 6:
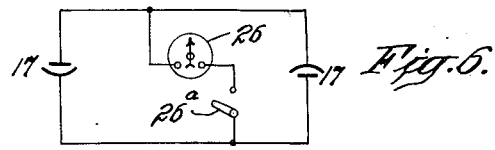

Fig. 1 is a rear elevation, partly in section, of the instrument; Fig. 2 is an enlarged vertical section on the line 2—2 of Fig. 1; Fig. 3 is a front elevation showing the scale plate; Fig. 4 is a horizontal section on the line 4—4 of Fig. 1; Fig. 5 is a horizontal section on the line 5—5 of Fig. 1; and Fig. 6 is a diagram of the electrical connections.

The instrument is based upon the principle of causing light from a common source to pass through each of the two solutions to be compared and adjusting the depth of one solution, through which the light passes, relatively to the depth of the standard solution through which the light passes, until equivalent amounts of light are transmitted through the two different depths of solution. The intensity of the transmitted light through the two solutions is measured by responsive means in the form of photoelectric cells. Such cells generate electromotive forces in accordance with the amount of light to which they are exposed; and by relating the electromotive forces of two cells to each other and by use of a sensitive instrument, such as a galvanometer, in such a way as to be responsive to any difference between the electromotive forces of the two cells, it is apparent that after suitable adjustment of the beam of light going through one solution in respect to the one going through the other, a condition can be attained in which the galvanometer will show a zero reading. Thus by adjusting the depth of the solution to be tested until the light transmitted therethrough is equivalent to the light transmitted through the standard solution, as shown by the zero reading of the galvanometer, the scale readings showing the depth of the two solutions will be a measure of the relative concentration of the two solutions. This method of comparison gives high sensitivity, as change of light through one solution to an amount of less than one tenth of one percent of the total light intensity, may usually be detected. Stability is insured by using a common source of light and a simultaneous comparison of the light transmitted through the two solutions. Any momentary change in the light source will simultaneously and similarly affect both cells and thus introduce no material error due to change of voltage of the light source, such as a lamp bulb deriving its voltage from the usual lighting supply circuit.

Referring to the drawings; the instrument is mounted upon a base 1 which supports an upwardly extending box-like frame 2. At the top of the frame is mounted a horizontally extending bearing 3 which carries an eccentrically mounted support 4 for the lamp bulb 5 which is the source of light for the instrument. The support 4 may be turned in the bearing 3 for adjusting the position of the filament of the bulb in relation to the light receiving portion of the instrument; and the bearing 3 may also be moved in the supporting frame 2 for similarly adjusting the position of the light bulb filament. Set-screws 6 serve to retain the parts in fixed position after adjustment. A cylindrical hood 5a is secured to the frame 2 and encloses the bulb 5 for confining the light of and for shielding the bulb 5, opening 5b being formed in the top of the hood and provided with an upwardly dis-placed cover 5c to provide ventilation for dissipating the heat from the bulb.

Supported upon the rear of the frame 2 is a box frame 7 of triangular form and having its base in a horizontal position. Within this frame is mounted a triangular prism 8 having its apex at the top and having its two lower ends cut to form faces 8a. This prism is for the purpose of receiving the light rays through an opening in the top of frame 7 and deflecting them to strike the surfaces 8a which again deflect the rays to pass vertically downward through two openings in the lower part of the frame 7 and thereby direct two beams of light downwardly through the solutions to be tested, as will be later explained.

At the top of frame 7 is mounted the lens piece 9 for receiving the rays from the source and directing them downwardly to strike the two sides of the apex of prism 8. A cylinder 10 is rotatably mounted at its lower end on the top of frame 7 and encloses the lens 9 and is likewise rotatably mounted at its upper end in the lower part of the tube 5a. A cylindrical support 11 is held within the upper end of the tube 10 and projects through an opening in the lower part of the shield 5a and carries a ground glass plate 11a through which light from the bulb 5 is transmitted. Within the tube 10 is a fixed tube 12 of slightly smaller diameter and which has an opening on its side. The tube 10 likewise has an opening on its side so that when the tube 10 is rotated, the two openings may coincide for the purpose of inserting or removing light filters, as may be desired. The tube 10 is afterwards turned on its axis so as to close the openings.

The frame 7 is provided with a removable cover plate 7a as shown in Fig. 2 and carries on its inner surface a leaf spring 7b for the purpose of yieldably holding the prism 8 against the inside surface of the frame 7. On the opposite sloping sides of the frame 7 are located two adjustable thumb-screws 7c, the inner ends of which impinge against the sides of the prism 8. It is evident by loosening one of the screws 7c and turning the other to move inwardly, the prism 8 may be adjusted horizontally to one side or the other for the purpose of compensating for errors of manufacture, as hereinafter explained.

A pair of plungers 13 and 13a are fixed in position at their upper ends by a screw connection with openings in the bottom of frame 7 which openings are below the two surfaces 8a of the prism. These plungers are hollow and carry glass plates 13b at their lower ends. These plates are sealed to the ends of the plungers to prevent the entrance of any fluid within them. The two parallel paths of light rays from the faces 8a of the prism pass downwardly through the plungers 13 and 13a respectively and through the glass plates 13b to lower portions of the apparatus. The tubes 13 and 13a are opaque to the entrance of extraneous light and it is apparent that the only light which passes through the plates 13b, is that derived from the bulb 5 and which passes through the ground glass 11a, lens 9, prism 8 and thence through the tubes 13 and 13a.

The plungers extend within a pair of cups 14a which are removably supported at their lower ends in circular receptacles 14b. One side of the receptacles is slotted and the cups carry pins 14c at their lower ends which are adapted to drop into the slots and thereby hold the cups in definite positions in the receptacles. Secured to the lower end of each of the receptacles is a circular disc 15 from each of which depends a cylinder 15a having its upper end secured to the disc 15 by a pin and slot bayonet joint 15b.

Fitted within the cylinders 15a are a pair of cylinders 16 secured in fixed position to the base 1. The upper ends of cylinders 16 carry photoelectric cells 17 from each of which a pair of flexible leads 17a extend downwardly and out through an opening 16a at the lower end of the cylinder whereby the cells may be connected to an outside indicating circuit.

The lower ends of the cups 14, 14a carry glass discs 14d which are sealed to prevent the escape of fluid therefrom. Opposite the plates 14d are openings 15c in the discs 15. These openings are directly over the photoelectric cells 17. The cups and discs 15 and cylinders 15a are adapted to be moved and adjusted vertically with reference to their respective plungers 13, 13a and are also adapted to be adjusted relatively to each other. During the upward or downward movement of these parts, the cylinders 15a slide over the cylinders 16 by a close fit and thereby prevent any extraneous light from entering and affecting the photoelectric cells. The cups 14, 14a are opaque to the entrance of light and consequently the only light which strikes each of the photoelectric cells is that which passes downwardly through their respective plungers, cups and openings 15c.

The mechanism for moving the cups up and down will now be described. On the front of the frame 2, as shown in Figs. 2 and 4, is mounted a cylindrical frame 20 extending crosswise to the frame 2. The frame 20 is seated in cutout portions of the frame 2 and held in position by a screw 20a which extends through the rear portion of the frame 2 and is threaded into a mid portion of the frame 20. Within the frame 20 is a pair of bearings 20b which journal a pair of shafts 20c. Milled knobs 20d, adapted to be turned manually are secured to the outer ends of the shafts 20c. Each of the shafts 20c have affixed thereto a pinion 20e. Within the frame 2 and at the right and left ends thereof are mounted vertically slideable plates 21. These plates are nicely fitted within the frame 2, and have inwardly projecting portions 21a upon the front surfaces of which are racks 21b. The pinions 20e respectively engage with the racks 21b and it is evident that turning the knobs 20d will cause the plates 21 to move up and down as individually adjusted by the user.

Secured to each of the plates 21 at rear thereof is a plate 22, as are shown in Figs. 4 and 5. These plates are slideable against the inside of the back of the frame 2 and each is marked on its front face with a scale as indicated in Fig. 3. Between the two plates 22 and secured to the back of the frame 2 is another plate 23 of comparatively short length having a zero reading and a vernier scale at each edge thereof, in juxtaposition to the scales of the plates 22, as shown in Fig. 3. On the face of the frame 2 and just above the manual adjusting means, already described, is an opening 24 covered by a glass plate 24a which plate is carried by a frame 24b secured to the face of the frame 2. This opening or window is opposite the fixed scale plate 23 whereby an observer may conveniently read the scale plates 22 with reference to the fixed scale 23. A reflecting mirror 24c, as shown in Fig. 2, is fixed within the frame 2 and is inclined with its lower edge near the scale plates and its upper edge at the lower edge of the window plate 24a. Within the top portion of the box frame 2 is another oppositely inclined mirror 24d; and opposite this mirror is an opening 24e to the interior of the light cylinder 5a. Light from the bulb 5 passes through opening 24e and strikes the mirror 24d where it is reflected downwardly to the mirror 24c which reflects the light upon the scales for illuminating the same.

A vertical slot 25, as shown in Fig. 5 is formed at each side of the frame 2. A bracket 25a is secured to each of the slideable plates 21, as shown in the left-hand portion of Fig. 5 and the brackets are moveable with the plates 21 in the slots 25. From the bases which hold the cups 14, 14a, extend arms 25b which are in turn secured to the brackets 25a respectively, as shown in the left-hand portion of Fig. 5. It is evident that when the left-hand knob 20d is turned, its scale plate 22 will be moved relatively to the fixed scale plate 23 and that the cup 14a will be moved relatively to the plunger 13a; likewise when the right-hand knob 20d is turned, its scale plate and cup 14 will be moved accordingly. Thus the scale readings of the plates 22 with reference to the zero reading of the fixed plate 23 will show the relative depths of the fluids between the ends of the plungers and the bottoms of the two cups.

The leads 17a from the photoelectric cells are connected so that the cells are in series with each other, as shown in Fig. 6. A galvanometer 26 is connected across the leads connecting the cells with the usual switch or tap key 26a, as likewise shown in Fig. 6. It is evident that with this form of connection, each cell tends to pass a current through the galvanometer in a direction opposite to that of the other cell. Obviously when the current output of one cell is equal to that of the other, there will be no deflection of the galvanometer 26.

In using the instrument the standard fluid solution is placed in each cup, and one of the cups, such as cup 14, is adjusted to a desirable position. After suitably adjusting the prism and the other cup as described and for reasons, which will appear, later until the galvanometer 26 shows a zero reading, the standard solution is removed from cup 14 and replaced by the solution to be tested. The position of cup 14 is then adjusted until the light transmitted and imposed upon each of the photoelectric cells 17 is such that the galvanometer 26 again shows a zero reading.

Under this condition of equivalent transmission of light through the two compared fluids, the relative concentration of the two solutions will be shown by the relative depths through which the light is transmitted which in turn is directly shown by the relative readings of the plate 22 associated with cup 14 with reference to the zero reading of the fixed scale plate. It is evident that any unknown fluid or medium may be quickly and quite accurately tested with reference to a standard fluid or medium by this simple and direct method.

As previously described the prism 8 is adjustable horizontally by means of the thumb-screws 7c. This is for the purpose of compensating for slight variations of the different parts in the course of manufacture such as in the lens 9, ground glass 11a, prism 8 and its different surfaces, position of the bulb 5 and for differences in the photo-electric cells 17 and in the assembly of the parts. The adjustment is made by placing portions of one of the solutions under examination in each of the cups 14 and 14a. The knobs 20d are then adjusted until the scale readings show the same depth of fluid between the ends of the plungers and the bottoms of the cups. In case the reading of galvanometer 26 is not then at the zero point, the prism 8 is adjusted slightly to the right or left by means of the screws 7c, until the galvanometer 26 is brought as near as possible to its zero reading. Final and exact adjustment to zero reading of the galvanometer is then made by carefully racking one cup up or down as necessary. Such an adjustment will equalize any inaccuracies of manufacture and compensate for them because when the prism 8 is shifted and one of the cups adjusted as described, such amount of light is adjusted to strike on the two photoelectric cells 17 as will give a zero reading of the galvanometer. Consequently when dissimilar solutions are later compared the relative depths thereof, as shown by the scale readings, will quite accurately show their relative concentration or turbidity. It is also evident that any change in intensity of the light source 5, as may be caused by change of potential of the source of electromotive force, will equally affect the two paths of light through the two fluids and consequently have no affect on their comparison. The bulb 5 may be a usual six volt lamp connected to the usual lighting supply circuit with a suitable transformer, or resistance, or other means introduced for reducing the voltage applied to the bulb 5. Either a direct current or an alternating current source may be used for this purpose.

Although a preferred embodiment of this invention has been described, various modifications may be made therein and various applications may be made thereof, without departing from its scope.

We claim:

1. A photometer comprising a common light source, means for dividing the light in two paths through two fluid media to be compared, means for adjusting the relative depths of the media through which said light is transmitted, and light sensitive responsive means for indicating when the light transmitted through the two media is of equivalent amount.

2. A photometer comprising a common light source, means for dividing the light in two paths through two fluid media to be compared, means for adjusting the relative depths of the media through which said light is transmitted, and balanced light sensitive responsive means for indicating when the light transmitted through the two media is of equivalent amount.

3. A photometer comprising a common source of light, means for dividing the light in two paths through two fluid media to be compared, means for adjusting the relative depths of the media through which said light is transmitted, photoelectric cells simultaneously receiving the light transmitted through said media, and a responsive device connected in circuit with said cells for indicating when the light transmitted through said media is of equivalent amount.

4. A photometer comprising a common light source, means for dividing the light in two paths through two fluid media to be compared, means for adjusting the relative depths of the media through which said light is transmitted, means for adjusting the relative amount of light directed in said two paths, and light sensitive responsive means for indicating when the light transmitted through the two media is of equivalent amount.

5. A photometer comprising a common light source, means for dividing the light in two paths through two fluid media to be compared, means for adjusting the relative depths of the media through which said light is transmitted, a scale for directly reading the relative adjusted depths of the two media, and light sensitive responsive means for indicating when the light transmitted through the two media is of equivalent amount.

6. A photometer comprising a common light source, a device for dividing the light in two paths through two fluid media to be compared, means for adjusting the relative depths of the media through which said light is transmitted, light sensitive responsive means for indicating when the light transmitted through the two media is of equivalent amount, and means for adjusting said device for changing the relative amount of light directed in said two paths.

7. A photometer comprising a common light source, a prism for dividing the light in two paths through two fluid media to be compared, means for holding the media in the light paths, means for adjusting the relative depths of the media through which said light is transmitted, light responsive means subjected to the light transmitted through said media for indicating when the light transmitted through the two media is of equivalent amount, and means for adjusting said prism for changing the relative amount of light directed in said two paths.

8. A photometer comprising a vertical frame, a source of light at the top of the frame, a prism below said source for directing the light in two paths downwardly through the two fluid media to be compared, fixed plungers through which said two paths of light are transmitted, vertically adjustable cups for holding said media to be compared in said light paths and enveloping said plungers, a scale for showing the relative depths of the media to be compared, and light sensitive means below said cups responsive to the light transmitted through said media for indicating when the transmitted light is of equivalent amount.

9. A photometer comprising a vertical frame, a source of light at the top of the frame, a prism below said source for directing the light in two paths downwardly through the two fluid media to be compared, fixed plungers through which said two paths of light are transmitted, vertically adjustable cups for holding the media to be compared in said light paths and enveloping said plungers, a scale for showing the relative depths of the media to be compared, photoelectric cells below said cups subjected to the light transmitted through said media, and indicating means for showing when the electromotive force of said cells is balanced.

10. A photometer comprising a common light source directing light in two paths through two fluid media to be compared, means for adjusting the depth of the medium through which said light is transmitted in one path, and light sensitive responsive means for indicating the comparative amount of light transmitted through the two media.

11. A photometer comprising a common light source directing light in two paths through two media to be compared, means for adjusting the depth of the medium through which said light is transmitted in one path, and light sensitive responsive means for indicating when the light transmitted through the two media gives a balanced effect.

12. A photometer comprising a common light source directing light in two paths through two fluid media to be compared, means for adjusting the depth of the medium through which said light is transmitted in one path, photoelectric cells simultaneously receiving the light transmitted through said media, and a responsive device for indicating when the light transmitted through the two media gives a balanced effect.

13. A photometer comprising a common light source directing light in two paths through two fluid media to be compared, means for adjusting the relative amount of light directed in the two paths, means for adjusting the depth of the medium through which said light is transmitted in one path, and light sensitive responsive means for indicating when the light transmitted through the two media gives a balanced effect.

ARNOLDUS GOUDSMIT.
WILLIAM H. SUMMERSON.